US008721822B2

(12) United States Patent
Hood

(10) Patent No.: US 8,721,822 B2
(45) Date of Patent: *May 13, 2014

(54) METHOD OF MAKING AND USING SHAPE MEMORY POLYMER COMPOSITE PATCHES

(75) Inventor: Patrick J. Hood, Bellbrook, OH (US)

(73) Assignee: Cornerstone Research Group, Inc., Dayton, OH (US)

(*) Notice: Subject to any disclaimer, the term of this patent is extended or adjusted under 35 U.S.C. 154(b) by 242 days.

This patent is subject to a terminal disclaimer.

(21) Appl. No.: 13/183,507

(22) Filed: Jul. 15, 2011

(65) Prior Publication Data

US 2011/0277914 A1    Nov. 17, 2011

Related U.S. Application Data

(63) Continuation of application No. 11/611,184, filed on Dec. 15, 2006, now Pat. No. 7,981,229, which is a continuation of application No. 11/569,902, filed on Sep. 8, 2008, now Pat. No. 7,938,923, which is a continuation of application No. PCT/US2005/019842, filed on Jun. 6, 2005, application No. 13/183,507, which is a continuation-in-part of application No. 12/719,197, filed on Mar. 8, 2010, now abandoned, and a continuation-in-part of application No. 12/755,868, filed on Apr. 7, 2010, now abandoned.

(60) Provisional application No. 60/577,033, filed on Jun. 4, 2004.

(51) Int. Cl.
*B29C 65/00* (2006.01)
*B29C 73/00* (2006.01)

(52) U.S. Cl.
USPC ......... 156/94; 156/95; 156/304.1; 156/304.2; 156/304.3; 138/97; 138/98; 138/99

(58) Field of Classification Search
None
See application file for complete search history.

(56) References Cited

U.S. PATENT DOCUMENTS

| | | | |
|---|---|---|---|
| 4,675,061 A | 6/1987 | Mead | |
| 4,950,258 A | 8/1990 | Kawai et al. | |
| 5,040,283 A * | 8/1991 | Pelgrom | 29/447 |
| 5,388,617 A | 2/1995 | Sasaki et al. | |
| 5,804,276 A | 9/1998 | Jacobs | |
| 6,083,442 A | 7/2000 | Gabilly | |
| 6,388,043 B1 | 5/2002 | Langer et al. | |
| 6,759,481 B2 | 7/2004 | Tong | |
| 6,986,855 B1 | 1/2006 | Hood et al. | |
| 2002/0137864 A1 | 9/2002 | Tong et al. | |

FOREIGN PATENT DOCUMENTS

| | | |
|---|---|---|
| EP | 0498602 | 8/1992 |
| JP | 2-240487 | * 9/1990 |
| JP | 02-289344 | 11/1990 |
| JP | 03-033595 | 2/1991 |
| JP | 6-213387 | * 8/1994 |
| WO | WO 96 12588 | 5/1996 |
| WO | WO 01 64387 | 7/2001 |

* cited by examiner

*Primary Examiner* — Justin Fischer
(74) *Attorney, Agent, or Firm* — Dinsmore & Shohl

(57) ABSTRACT

A method of repairing a composite component having a damaged area including: laying a composite patch over the damaged area; activating the shape memory polymer resin to easily and quickly mold said patch to said damaged area; deactivating said shape memory polymer so that said composite patch retains the molded shape; and bonding said composite patch to said damaged part.

19 Claims, 7 Drawing Sheets

METHOD OF MAKING AND USING SHAPE MEMORY POLYMER COMPOSITE PATCHES

CROSS-REFERENCE TO RELATED APPLICATION

This is a continuation of U.S. Utility application Ser. No. 11/611,184 filed Dec. 15, 2006, now U.S. Pat. No. 7,981,229, which is a continuation of U.S. Utility application Ser. No. 11/569,902 filed Dec. 1, 2006, now U.S. Pat. No. 7,981,229, which is a continuation of PCT application PCT/US2005/019842 filed Jun. 6, 2005, which all claim priority benefit of U.S. Provisional Patent Application Ser. No. 60/577,003 filed Jun. 4, 2004. Additionally this application is a continuation-in-part of U.S. Utility application Ser. No. 12/719,197 filed Mar. 8, 2010 and U.S. Utility application Ser. No. 12/755,868 filed Apr. 7, 2010.

STATEMENT REGARDING FEDERALLY SPONSORED RESEARCH

This application was made in part with government support under contract number NNK05OA29C awarded by the National Aeronautics and Space Administration. The government has certain rights in the invention.

BACKGROUND OF THE INVENTION

The present invention generally relates to the repair of components made from material such as metals, composites, wood, plastics, glass and other materials. It is to be appreciated that the present invention has general and specific industrial application in the repair of various materials. The term "composite" is commonly used in industry to identify components produced by impregnating a fibrous material with a thermoplastic or thermosetting resin to form laminates or layers.

Generally, polymers and polymer composites have the advantages of weight saving, high specific mechanical properties, and good corrosion resistance which make them indispensable materials in all areas of manufacturing. Nevertheless, manufacturing costs are sometime detrimental, since they can represent a considerable part of the total costs and are made even more costly by the inability to quickly and easily repair these material without requiring a complete, and expensive, total replacement. Furthermore, the production of complex shaped parts is still a challenge for the composite industry. The limited potential for complex shape forming offered by advanced composite materials leaves little scope for design freedom in order to improve mechanical performance and/or integrate supplementary functions. This has been one of the primary limitations for a wider use of advanced composites in cost-sensitive large volume applications. Additionally, the nature of composite materials does not lend itself to easy repair, especially on cheap, mass produced items and repair kits for more expensive, specialty items (such as in the aeronautic industry) are bulky, expensive, and require long time to complete the repair.

Shape memory polymers (SMPs) and shape memory alloys (SMAs) were first developed about 20 years ago and have been the subject of commercial development in the last 10 years. SMPs are polymers that derive their name from their inherent ability to return to their original "memorized" shape after undergoing a shape deformation. SMPs that have been preformed can be deformed to any desired shape below or above its glass transition temperature ($T_g$). If it is below the $T_g$, this process is called cold deformation. When deformation of the SMP occurs above its $T_g$, the process is denoted as warm deformation. In either case the SMP must remain below, or be quenched to below, the $T_g$ while maintained in the desired deformed shape to "lock" in the deformation. Once the deformation is locked in, the polymer network cannot return to a relaxed state due to thermal barriers. The SMP will hold its deformed shape indefinitely until it is heated above its $T_g$, whereat the SMP stored mechanical strain is released and the SMP returns to its performed state.

SMPs are not simply elastomers, nor simply plastics. They exhibit characteristics of both materials, depending on their temperature. While rigid, an SMP demonstrates the strength-to-weight ratio of a rigid polymer; however, normal rigid polymers under thermal stimulus simply flow or melt into a random new shape, and they have no "memorized" shape to which they can return. While heated and pliable, an SMP has the flexibility of a high-quality, dynamic elastomer, tolerating up to 400% elongation or more; however, unlike normal elastomers, an SMP can be reshaped or returned quickly to its memorized shape and subsequently cooled into a rigid plastic.

Several known polymer types exhibit shape memory properties. Probably the best known and best researched polymer types exhibiting shape memory polymer properties are polyurethane polymers. SMP polymers known in the art include articles formed of norbornene or dimethaneoctahydronapthalene homopolymers or copolymers as set forth in U.S. Pat. No. 4,831,094. Additionally, styrene copolymer based SMPs are disclosed in U.S. Pat. No. 6,759,481 which is incorporated herein by reference.

Modern aircraft are perhaps one of the largest users of composite materials. Composites are widely used in the aerospace industry to provide aircraft components such as fuselages, wings and tail fins, doors and so on. This is because composite components have the physical attribute of being relatively lightweight while at the same time having high structural strength in comparison to metals. Such composite components typically are of a sandwich construction. When damage occurs to such structures, for example by impacted damage from a flying stone or other debris or from a dropped tool, a damage crater, crack, or hole will be formed in the object concerned.

The general approach to repair damage is to remove the damaged part from the aircraft, and repair the damage by using an electric blanket with a vacuum bag. A "prepreg" formed of a layer of fibrous material impregnated with uncured resin is laid over the area to be repaired. The electric blanket applies heat to that area to cure the prepreg. The vacuum bag holds the electric blanket in position over the repair area while at the same time applying a compaction force to the prepreg.

Repairs using this approach are not however always satisfactory. This is because the inconsistency of the heat provided by the electric blanket leads to unreliability in the curing. Also, the use of vacuum bag compaction is not very effective in removing air from the prepreg so that the repaired area is not necessarily void free. Additionally, it normally takes a long amount of time to remove, repair, replace, and test the damaged component on an aircraft. Finally, the majority of time in using these methods typically involves waiting for the resin in the composite material and filler to cure. If this cure cycle was eliminated not only would there be a vast reduction in time but also in the emissions and use of chemicals, eliminating the cleanup and disposal of said chemicals.

A similar method of repair to such composite structures generally entails a lightweight composite filler material being inserted into the crater in a thixotropic state to protrude slightly from the outer surface. The filler is then allowed to harden and cure. It is then abraided flush with the surface of the structure. A patch of fiber reinforced composite material in either cured or more generally uncured state is then adhered to the surface of the structure over the filled crater using a separate adhesive and the patch is then bonded in position using both vacuum and heat. The vacuum is normally applied using an airtight sheet of material placed over the repair and temporarily sealed to the structure using a bead of adhesive around its periphery. A vacuum is then created under the sheet to try to ensure that any air bubbles are expelled from underneath the patch and to ensure good bonding. At the same time a heater blanket positioned inside or outside the vacuum bag will apply heat to the repair to effect hardening and curing of the adhesive which is normally a curable resin.

Multi-layered repair patches are also known in the art and these repair patches have been used both for repairing holes in drywall material as well as repairing holes in automobile bodies. U.S. Pat. No. 5,075,149 issued to Owens et al. ("Owens"), U.S. Pat. No. 4,707,391 issued to Hoffmann ("Hoffmann '391") and U.S. Pat. No. 4,135,017 issued to Hoffmann ("Hoffmann '017") are all directed to multi-layer repair patches.

Owens discloses a three-layered patch with a metal plate disclosed between two polyester sheets. The metal plate is held in place between the two polyester sheets with a semi-solid adhesive such as urethane. The semi-solid adhesive fixedly attaches the two polyester sheets together as well as fixedly attaching the reinforcing metal plate between the two sheets. Owens is not useful for repairs which require the application of bonding material or plaster to the repair patch because the bonding material or plaster cannot readily pass through the mesh due to the presence of the urethane adhesive. Additionally the patch cannot be molded quickly, on-site, without additional time and equipment.

Hoffmann '391 discloses a two-layer patch including a perforated metal plate with an outer fiberglass mesh attached to one side of the plate. A glue or adhesive coating is applied to the surface of the plate that is attached to the surface to be repaired and an additional adhesive coating is applied to the inward-facing surface of the fiberglass mesh to attach the mesh to the metal plate as well as to attach the mesh to the surface under repair.

Hoffmann '017 also discloses a two-layer patch. An inner metal plate is covered with adhesive that secures one surface of the plate to the surface under repair. An outer plate cover is laminated onto the exterior side of the metal plate by means of a layer of adhesive applied to the inward-facing side of the plate cover.

Both of these methods employ metal plates in the final patch with limits the ability of these patches to be easily and quickly molded to the damaged part on-site. Additionally, the use of metal eliminates some of the weight saving advantages of a pure composite repair patch.

Additionally, the repairs alone in these methods can take anywhere from approximately four hours or more to complete, mainly due to the time necessary to allow curing of the filler and adhesive. When taking into account the time to remove the damaged parts, mold the patch to the damaged area, and replace the part the time involved increases. In addition, despite the use of vacuum equipment to attempt to expel all air entrapped under the patch, the complete absence of such entrapment cannot be guaranteed and non-destructive testing may need to be carried out to ensure the structural integrity of the repair. With aircraft downtime often running at $US100,000.00 per hour it will be appreciated that enormous potential savings are possible when employing the method of the instant invention.

Additionally, if mass produced items, such as car hoods, bumpers, and other manufactured parts are damaged, it is oftentimes less expensive to replace the entire part than to repair it, although such parts are often expensive themselves. Thus there is a need for a cheap, quick, and effective method of repairing such mass produced parts and for quickly and reliably repairing aircraft and other high end parts.

It is the object of the present invention to provide a preformed and cured patch and a method to quickly and cheaply permanently repair any number of items with composite materials which retain similar or greater mechanical properties of the parts repaired. Another object is to provide a method for quickly and cheaply joining two parts together in order to form a larger part which retains similar mechanical properties of the original parts. These and other objects of the present invention will become apparent from the following specification.

SUMMARY OF THE INVENTION

According to a first aspect of the invention there is provided a patch of fiber reinforced shape memory polymer resin composite material for attachment to a surface of a fiber reinforced plastics composite, metal, wood, or plastic structure over an area of damage to the structure, the patch defining an outer surface, a bonding surface opposed thereto and a peripheral edge, the patch including fiber reinforcement and shape memory polymer resin as the matrix material with said matrix material being in a substantially final state of hardness. The patch may conveniently include a final protective coating applied to the outer surface thereof. The process according to the first aspect is primarily to be used for temporary or cosmetic repair of manufactured parts however permanent repairs could be accomplished if desired.

This patch and process reduces the time to repair composite parts and other material and eliminates the creation of volatile components that must not be released into the environment as per EPA requirements during the repair process. The combination of both of these factors makes this process highly transferable into mass production of patches for high-performance composites at an affordable price and for the mass production of patches for use in lower performance items as well. Additionally the patch can be molded on site by hand, iteratively or in one step, without the use of significant amounts of equipment or special orders to pre-mold the composite patch to match the specific damaged area. Another benefit is that by using shape memory polymer as the resin the damaged part does not need to be removed from the larger component, for example removing the wing from the airplane, in order to mold the patch and repair the damage.

The patch, according to the first aspect of the invention, will typically be in some predetermined memorized geometric shape, typically a flat square or rectangle, but can be in any desired preformed shape. In order to mold the patch to the desired shape, the shape memory polymer resin is activated, typically using heat to raise the temperature of the shape memory polymer resin above its activation temperature or light to activate the shape memory polymer, at which point the shape memory polymer resin, and the entire composite part, become soft and can be mechanically deformed, typically by hand, to the desired shape. In a second embodiment, only a portion of the patch can be activated and then molded to the desired shape. This step can be iteratively repeated until the entire patch has been molded to the desired final shape. Once the composite part has cooled below the activation temperature of the shape memory polymer resin or has been deactivated by light, the composite part will retain the new, deformed shape, and can be bonded to the damaged part with adhesives. In another embodiment, the patch can be can be molded, bonded, and then deactivated.

Bonding the patch to the damaged part is typically accomplished with some form of adhesive. While some adhesives may require heat curing, choosing the correct shape memory polymer to use as the resin matrix will prevent this curing from causing the composite material to become soft again, and lose its molded shape, especially if using a light activated shape memory polymer resin. This presents little difficulty as curing the adhesive may include raising the temperature thereof to a temperature less than substantially 100° C. where there is a large availability of shape memory polymers whose activation temperatures are above 100° C. It will be appreciated that adhesive cure temperatures could be as high as 180° C., but repairs in the field are likely to be more sound if a lower curing temperature resin is used to avoid the possibility damage to the composite patch or further damage to the part being repaired. Additionally, certain formulations and types of shape memory polymer can be made with a transition temperature well in excess of 180° C. such that high cure temperatures for most adhesives are of little concern. Where the adhesive is a curable resin the method may include the step of curing the adhesive for a period less than substantially one hour. Such a short curing time can dramatically shorten the overall repair time according to the method of the invention, especially when only the adhesive and not the resin in the patch require curing. Furthermore, some adhesives, such as pressure sensitive adhesives, require no curing, thus eliminating this concern.

Manufacture of the patch according to the invention includes creating a cured composite patch within a shape memory polymer resin matrix. The patch is preformed to a predetermined, memorized shape. The composite patch may be of any required thickness and any suitable number of layers of fibrous material within a shape memory polymer resin matrix, one or more, in order to give the required structural strength in particular circumstances.

It will be appreciated that when carrying out the repair method of the invention all the normal preparatory work may be done to the damaged area in the usual way, for example thorough drying thereof, abrasion and cleaning of the surface to be repaired and debris and sharp edge removal. Best results for the repair are likely to be obtained when the liquid adhesive is painted onto all contact areas with a brush or the like to ensure good adhesion.

The method of the invention thus enables the use of the patch according to the first aspect of the invention in a manner which avoids the use of a separate filler material which must be separately hardened and abraded flush with the surface to be repaired prior to the application of the patch thereto with, again, a separate adhesive. Additionally the method of the inventions enables use of a patch without any curing of the resin employed in the composite patch, although a cured bonding agent can be used. Overall time savings for repairs according to the method of the invention are expected to be at least three hours over prior art methods.

A second aspect of the invention allows for the permanent repair of manufactured parts including high strength applications of airplane parts and boat hulls. According to the second aspect of the invention there is provided a patch of fiber reinforced shape memory polymer resin composite material for attachment to a surface of a fiber reinforced plastics composite, metal, wood, or plastic structure over an area of damage to the structure, the patch defining an outer surface, a bonding surface opposed thereto and a peripheral edge, the patch including fiber reinforcement and shape memory polymer resin as the matrix material with said matrix material being in a substantially final state of hardness. The patch may conveniently include a final protective coating applied to the outer surface thereof.

Another aspect of the invention allows for the quick and easy permanent repair of composite parts or other material. According to this aspect a part has been damaged and requires permanent repair. Typically the damaged section will have damage to the composite part and potentially damage to the underlying layers. Since the majority of time in repairing composite parts and other manufactured components with composite patches involves the curing of the composite eliminating this step will significantly reduce the amount of time and effort spent in repair. It is to be appreciated that the initial steps of creating a seamless transition phase between the damaged and undamaged sections of the part can be accomplished by normal means. Additionally, repair to the underlying filler, foam, or other material can be accomplished in a normal means.

Once the damaged area has been removed and a transition area has been created, smoothed, machined, cleaned, and otherwise prepared for repair, a preformed composite patch within a shape memory polymer resin matrix can be used. After activating the patch's shape memory polymer with either heat or light (or other electromagnetic radiation), the patch is then formed and molded into the damaged area either manually or with other means of assistance. The molding can be accomplished in one step or iteratively by activating a portion of the patch, molding it then repeating as many times as necessary to ensure the entire patch has be molded to the desired shape. Once the composite patch has been molded to the damaged area deactivate the shape memory polymer by letting it cool below its transition temperature or exposing it to light or other electromagnetic radiation. When the patch is hard, simply bond the composite material to the damaged part, clean and machine the patch to remove any excess patch material to ensure it is flush and level with the damaged part, and sand, finish, and coat if necessary with standard methods. Alternatively the deformed patch can be deactivated then bonded to the part as desired.

This patch and process reduces the time of composite repair and eliminates the creation of VOC (volatile components that must be not be released into the environment as per EPA requirements) during the repair process. The combination of both of these factors makes this process highly transferable into mass production of high-performance composites at an affordable price. Additionally, it is to be appreciated that this method of repair requires no curing time for the composite patch and eliminates the need to wait for any layer to cure before proceeding with the repair, thus significantly reducing the time to permanently repair a damaged part.

Another aspect of the invention allows the joining of two parts to create a single, larger part without the use of expensive welding, molding, or other methods that use expensive chemicals or require other controls to prevent discharge of chemicals and vapors. By placing two or more parts of similar or dissimilar shape or size in juxtaposition and using the patch to connect the parts, a larger part can be created. Once the patch is soft from activation of the shape memory polymer resin is can be molded to ensure a tight connection between two parts, even if the parts are of significant geometries. Once bonded to the individual parts, the larger part can be used.

Another embodiment is the repairing of material with a piece of shape memory polymer. This method is best used in processes where high strength is less preferable to other desires. This is accomplished in a manner similar to the composite patch.

Additional embodiments of the present invention include the use of other means of molding the composite patch and bonding said patch to the damaged part.

Other objects, features and advantages of the invention will be apparent from the following detailed description taken in connection with the examples and accompanying drawings and are within the scope of the present invention.

DETAILED DESCRIPTION OF THE INVENTION

Figure 1:
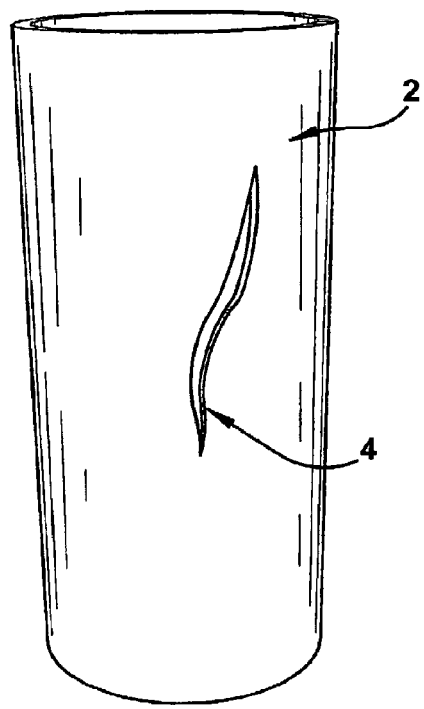
FIG. 1 is a perspective view of a typical pipe with a damaged area.

Referring to the drawings in greater detail, the method of the invention herein is directed to fabricating and using a composite patch with a Shape Memory Polymer (SMP) resin matrix or other shape memory material in the manufacture of castable composite parts.

Examples 1 and 2 below describe the exemplary methods of creating pre-form shape memory polymer (SMP) composite parts. In general, the preferred SMP is a styrene copolymer based SMP as disclosed in U.S. Pat. No. 6,759,481, however, other types of SMPs such as cyanate ester, polyurethane, polyethylene homopolymer, styrene-butadiene, polyisoprene, copolymers of stearyl acrylate and acrylic acid or methyl acrylate, norbornene or dimethaneoctahydronapthalene homopolymers or copolymers, malemide and other materials are within the scope of the present invention.

Example 1

A polymeric reaction mixture was formulated by mixing vinyl neodecanoate (10%), divinyl benzene (0.8%), and styrene (85.2%) in random order to yield a clear solution. Benzoyl peroxide paste (4%) which is 50% benzoyl peroxide, was then added to the resulting solution (all composition % are by weight). The resulting solution was kept cold in a refrigerator before use. To prepare the shape memory polymer resin matrix composite sheet, a piece of 3D weave carbon fiber is placed on a glass sheet, ensuring that there are no stray fibers and the carbon fiber piece is smooth. Next, pour some of the polymeric reaction mixture onto the carbon fiber. Use a plastic squeegee or plastic spreader to spread the resin evenly over the entire surface of the fabric. Thoroughly remove air bubbles and straighten the fabric. Place bleeder and breather fabric on top of the resin soaked carbon fiber. Then place the entire system in a high temperature vacuum bag with a vacuum valve stem and apply vacuum thoroughly, ensuring that there are no leaks. Cure the composite part with the following cycle: 1) A one-hour linear ramp to 75° C. in an oven, autoclave, or other form of controlled heating device; 2) A three-hour hold at 75° C.; 3) A three-hour linear ramp to 90° C.; 4) A two-hour linear ramp to 110° C.; 5) A one-hour linear ramp to 20° C. After curing, remove from oven and allow to cool. Remove vacuum bag, bleeder fabric, breather fabric, and glass plates from composite.

Example 2

A polymeric reaction mixture was formulated by mixing vinyl neodecanoate (10%), divinyl benzene (0.8%), and styrene (55.2%) in random order to form a colorless solution. Polystyrene granules (30%) were then added to the resulting solution. The resulting mixture was then allowed to sit at room temperature with occasional stirring until all the polystyrene granules were dissolved to give a clear, viscous solution. Benzoyl peroxide (4%) which is 50% benzoyl peroxide was then added to the resulting solution (all composition % are by weight). The resulting polymeric reaction mixture is continually stirred at or near 25° C., not to exceed 30° C. until a clear solution is achieved which can take 2 hours or more. The resulting solution is kept cold in a refrigerator before use. To prepare the shape memory polymer resin matrix composite sheet, a piece of 3D weave carbon fiber is placed on a glass sheet, ensuring that there are no stray fibers and the carbon fiber piece is smooth. Next, pour some of the polymeric reaction mixture onto the carbon fiber. Use a plastic squeegee or plastic spreader to spread the resin evenly over the entire surface of the fabric. Thoroughly remove air bubbles and straighten the fabric. Place bleeder and breather fabric on top of the resin soaked carbon fiber. Then place the entire system in a high temperature vacuum bag with a vacuum valve stem and apply vacuum thoroughly, ensuring that there are no leaks. Cure the composite part with the following cycle: 1) A one-hour linear ramp to 75° C. in an oven, autoclave, or other form of controlled heating device; 2) A three-hour hold at 75° C.; 3) A three-hour linear ramp to 90° C.; 4) A two-hour linear ramp to 110° C.; 5) A one hour linear ramp to 20° C. After curing, remove from oven and allow to cool. Remove vacuum bag, bleeder fabric, breather fabric, and glass plates from composite.

To achieve more than one fabric layer simply soak two or more layers of fabric in the shape memory polymer and stack on top of each other. The use of other fabrics such as carbon nano-fibers, spandex, chopped fiber, random fiber mat, fabric of any material, continuous fiber, fiberglass, or other type of textile fabric can be used to replace carbon fiber in the above examples. In Example 2 it is essential that while mixing after the addition of benzyl peroxide that the temperature of the resin be maintained below 30° C. as the mixture may become hot and explosive. Mixing in a cold water or ice bath ensures the temperature will not exceed 30° C. It can take two hours or more to fully mix.

Additionally, once cured, the shape memory polymer composite can be deformed for easy storage, shipping, or immediate use. If deformed for storage or shipping, simply activating the shape memory polymer resin will restore the composite part to its original, memorized shape.

The method of repairing all types of components and the composite patch joining system all utilize the same common features. The following description therefore relates to all of these features. The steps of deactivation and bonding can be performed in the orders presented or reversed if it is desired to bond the patch in a hard state as opposed to a soft state. Additionally only a part of the patch may be activated in order to deform a portion of the patch, then deactivating that portion and activating a second portion, iteratively, deforming the patch to the desired final shape.

Figure 3:
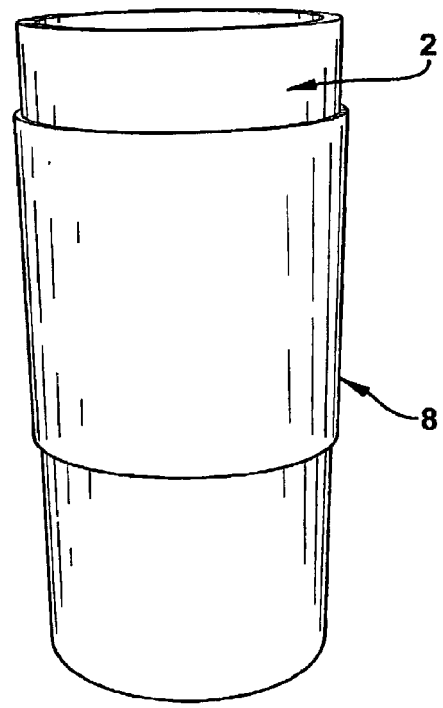
FIG. 3 is a perspective view of a typical pipe with damage repaired by the shape memory polymer composite patch.
Figure 2:
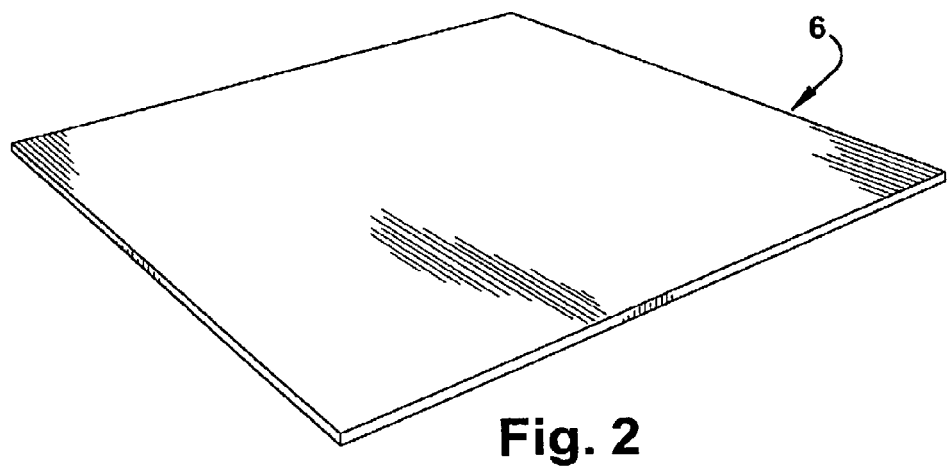
FIG. 2 is a perspective view of a shape memory polymer composite patch.

FIG. 1 shows a typical pipe, 2, with a crack, 4. FIG. 2 shows a flat, essentially square piece of shape memory polymer resin composite, 6. After activation, the shape memory polymer resin, 6, will become soft and can be easily molded to a variety of shapes. In the present example, a technician, wearing gloves, can easily mechanically deform the shape memory polymer, 6, to cover the crack, 4, and follow the curvature of the pipe, 2, as seen in FIG. 3 where the deformed patch, 8, covers the crack and essentially replicates the shape of the pipe. After bonding the patch to the pipe with an adhesive the pipe is repaired and can continue with normal operations.

Figure 4:
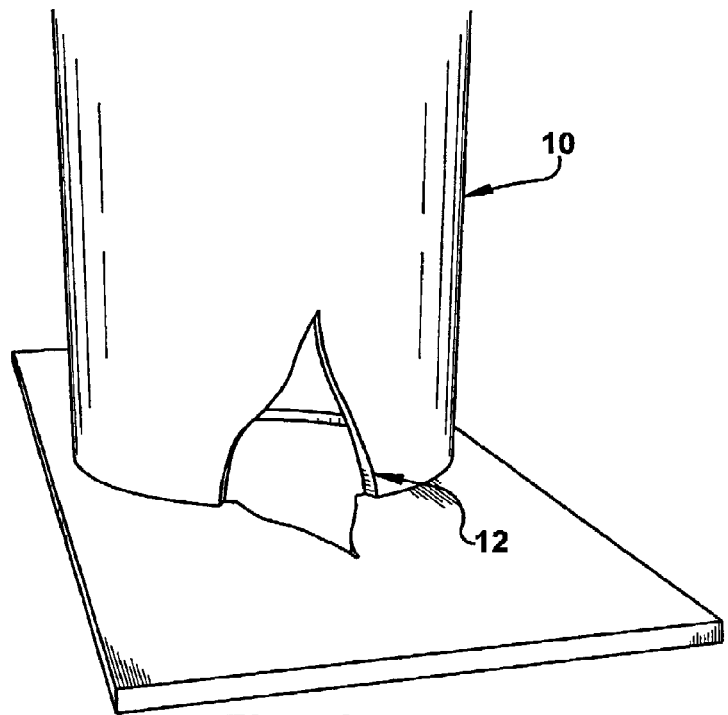
FIG. 4 is a perspective view of a typical pipe with damage at or near a wall, floor, or ceiling.
Figure 5:
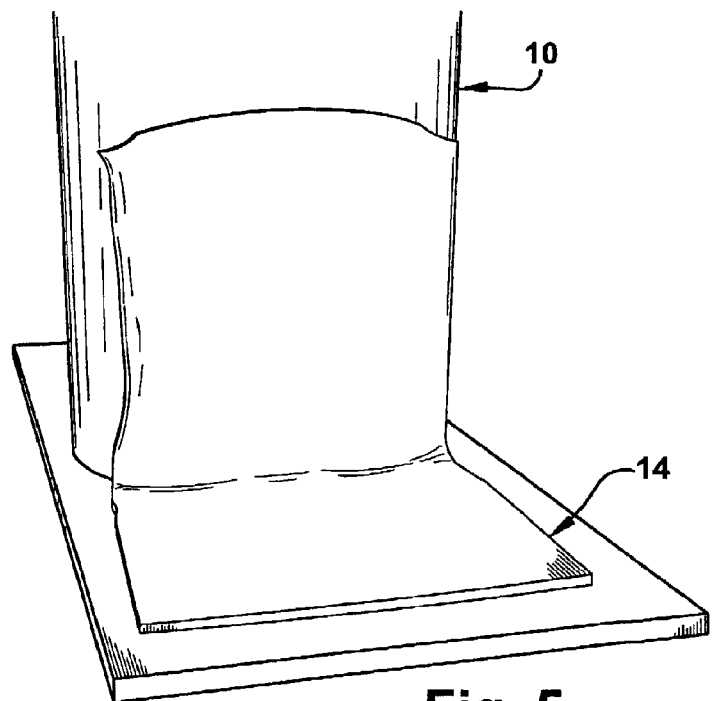
FIG. 5 is a perspective view of a typical pipe with damage at or near a wall, floor, or ceiling repaired by the shape memory polymer composite patch.

This process of patching various holes, cracks, leaks, and other damages is not limited to simple shapes. FIG. 4 shows a larger hole, 12, at the joint between a pipe, 10, and the ground, wall, or ceiling. Again, after activation, the shape memory polymer resin, 6, will become soft and can be easily molded to cover the hole, 12. In the present example, a technician, wearing gloves, can easily mechanically deform the shape memory polymer, 6, to cover the hole, 12, as seen in FIG. 5 where the deformed patch, 14, covers not only the hole in pipe, 10, but also ensures a good seal between the pipe, 10, and the wall, ceiling, or floor. After bonding the patch to the pipe and wall, ceiling, or floor with an adhesive the pipe is repaired and can continue with normal operations.

Additionally these repairs can be conducted not only by composite material but also by pure shape memory polymer resins which undergo the same activation, deformation, and bonding as seen in the above description.

Figure 6:
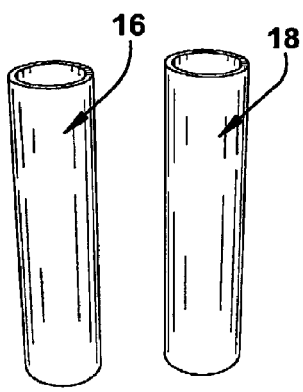
FIG. 6 is a perspective view of two short pieces of pipes that are to be joined together.
Figure 7:
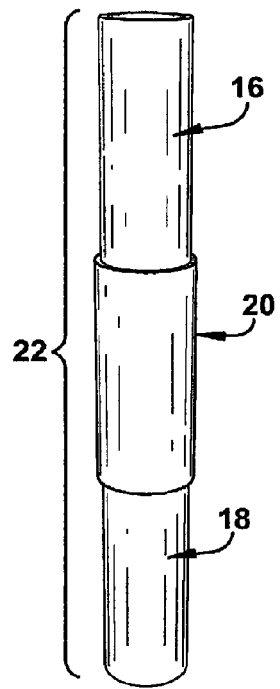
FIG. 7 is a perspective view of the single long pipe created from the two shorter pipes joined by the shape memory polymer composite patch.

Another embodiment of the invention is the ability to join two or more parts together easily in order to form larger parts. FIG. 6 shows two short pipes, 16 and 18. If it is desired to create a larger pipe from these two it may be very difficult or time consuming to weld or otherwise join these pipes. Using a composite patch or patch of shape memory material a single pipe can easily be made out of the two pipes, 16 and 18, as shown in FIG. 7. After placing, 16 and 18, end to end in order to form a single pipe, the shape memory polymer resin composite or pure shape memory polymer patch is activated and deformed around the pipe in order to effect a joining of the pipes with the deformed patch, 20. After bonding the patch to the pipes a new long pipe, 22, is created. This entire process can be quick and reduces the emission and use of typically bonding or welding tools that create fire and chemical hazards upon use.

Figure 8:
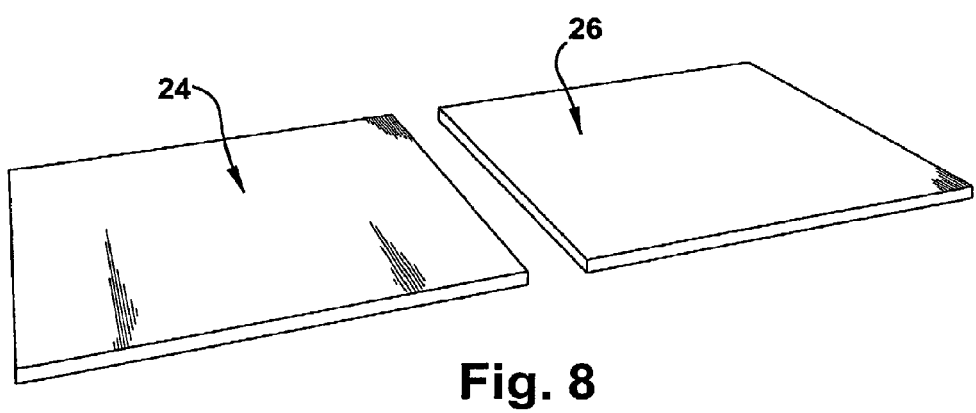
FIG. 8 is a perspective view of two flat pieces that are to be joined together.
Figure 9:
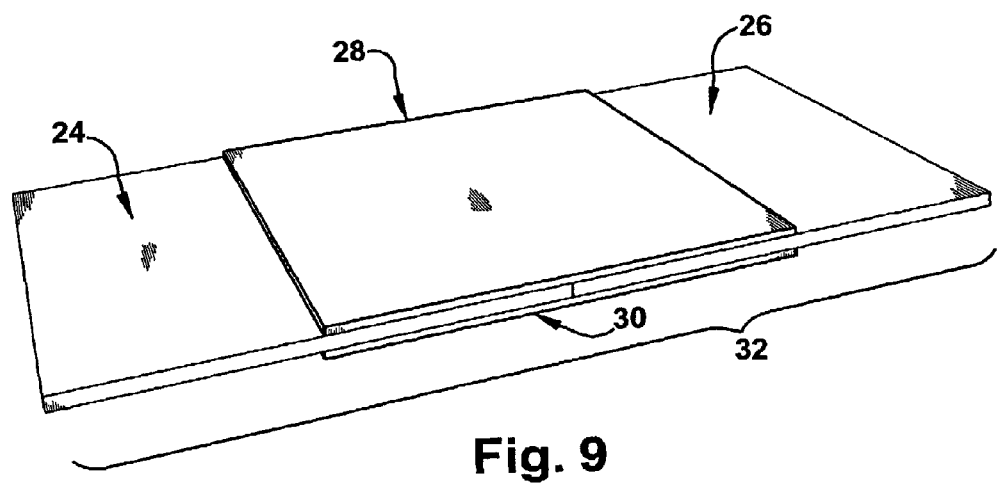
FIG. 9 is a perspective view of a single piece created from the two smaller pieces joined by two sheets of shape memory polymer composite patch.

This embodiment is not limited to pipes and can be used to join other geometric shapes together. FIG. 8 shows flat panels, 24 and 26, that may be joined. FIG. 9 shows that with the use of two patches, 28 and 30, the flat panels can quickly be joined without deforming the patches or deforming the panels so that patches can match the minor changes in the shape of the boards. After bonding the patches to the panels, a new larger panel, 32, is created.

Figure 10:
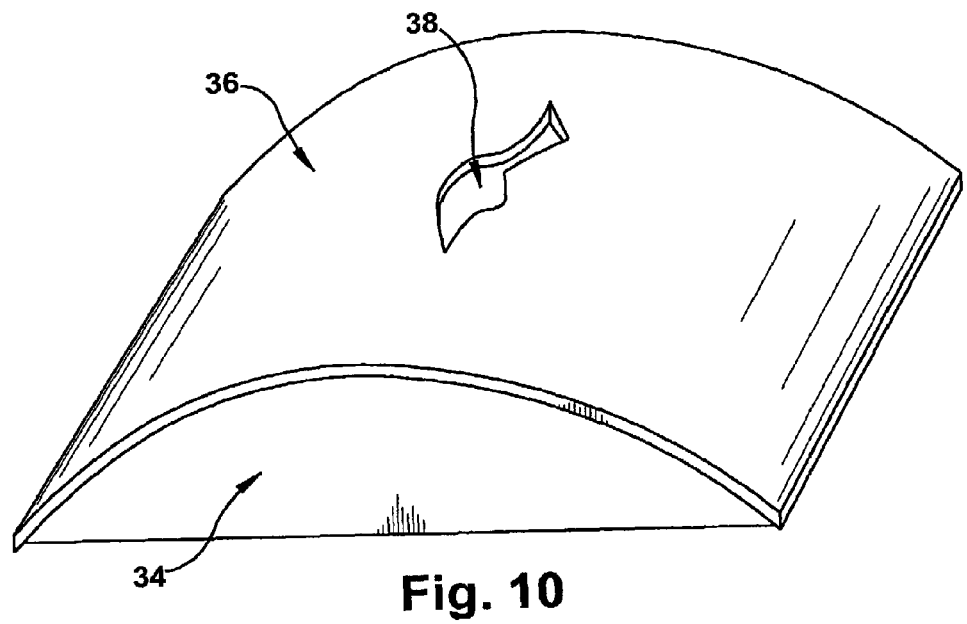
FIG. 10 is a perspective view of a section of a boat that has a damaged area.
Figure 11:
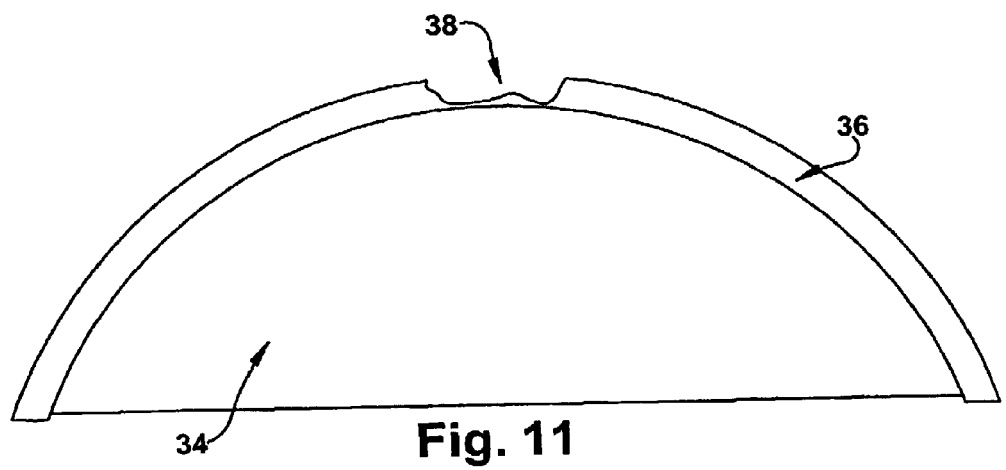
FIG. 11 is a sectional view of the same damaged area showing the fiberglass coating and damaged area.
Figure 12:
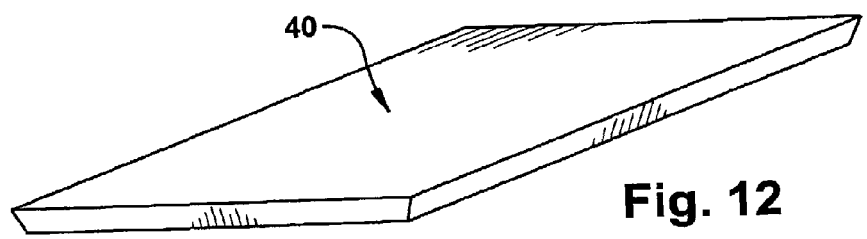
FIG. 12 is a perspective view of the shape memory polymer composite patch with slightly angled sides for a better fit of the patch.
Figure 13:
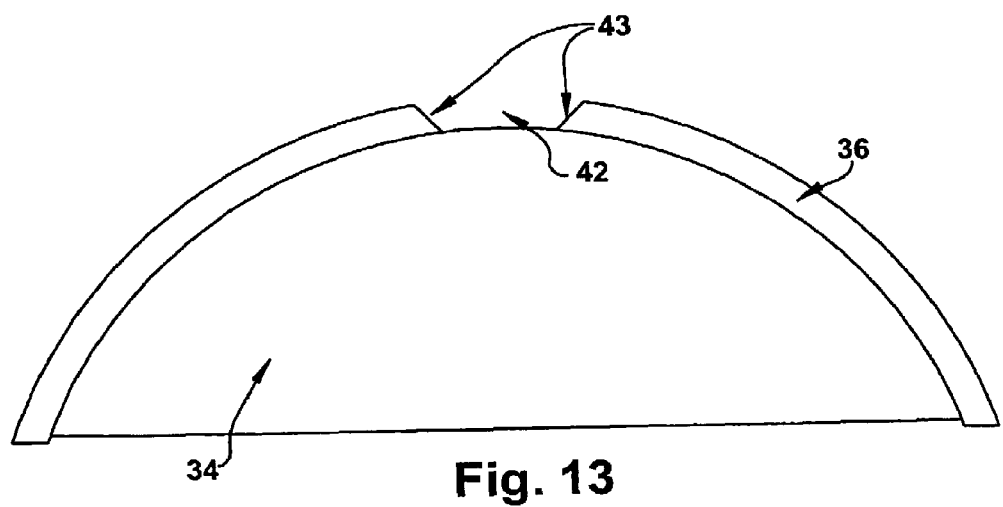
FIG. 13 is a sectional view of the damaged area after the damage area has been removed and a transition area from undamaged to damaged area has been created.

Another exemplary embodiment provides a means of permanent repair for manufactured parts that can significantly reduce the time required for repair. In FIG. 10 there is shown a section of a boat hull that has suffered damage, 38. The boat hull is made of a fiberglass outer layer, 36, and a filler or foam inner layer, 34. FIG. 11 shows a sectional view of the damaged hull, 38, with the outer fiberglass layer, 36, damaged from a piece of debris. While no damage is shown to the filler or foam inner layer, 34, if such damage was present, this damage could be repaired with normal methods. FIG. 12 shows a composite patch material, 40, made by the process of Example 1 above except that fiberglass, instead of carbon fiber, is used as the fibrous material. In order to repair the damaged area, 38, shown in FIGS. 10 and 11, the damaged area, shown as 42, must be removed as shown in FIG. 13, and a clean, smooth transition area is created, shown as 43. As shown in FIG. 13 the boat hull has been machined to create transition regions, 43, on all sides of the damaged area from undamaged fiberglass composite structure to the area to be repaired, 42.

Figure 14:
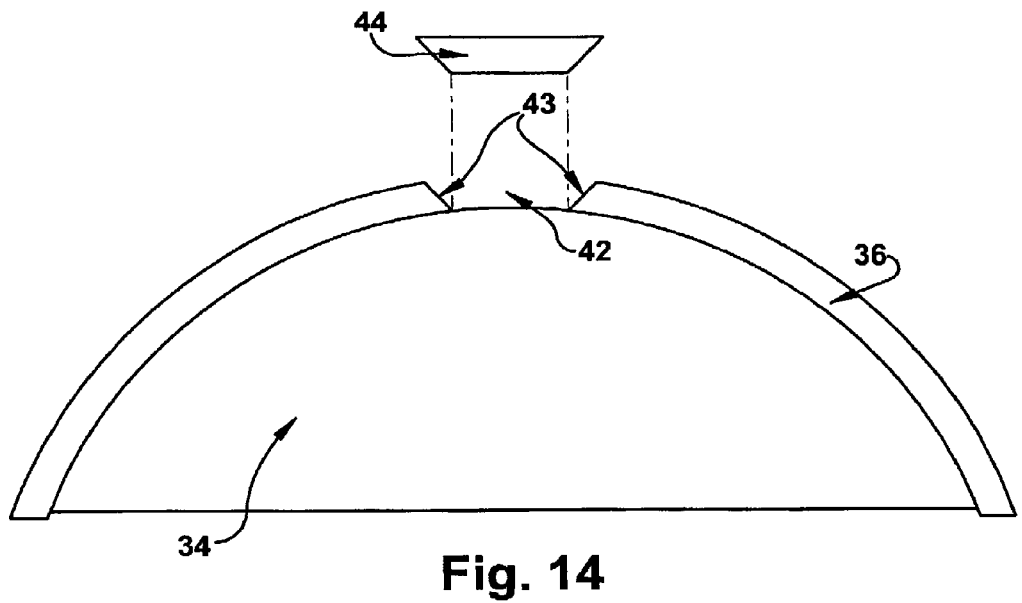
FIG. 14 is a sectional view of the of the damaged area ready for repair and the soft composite patch that is ready for molding into the damaged area.
Figure 15:
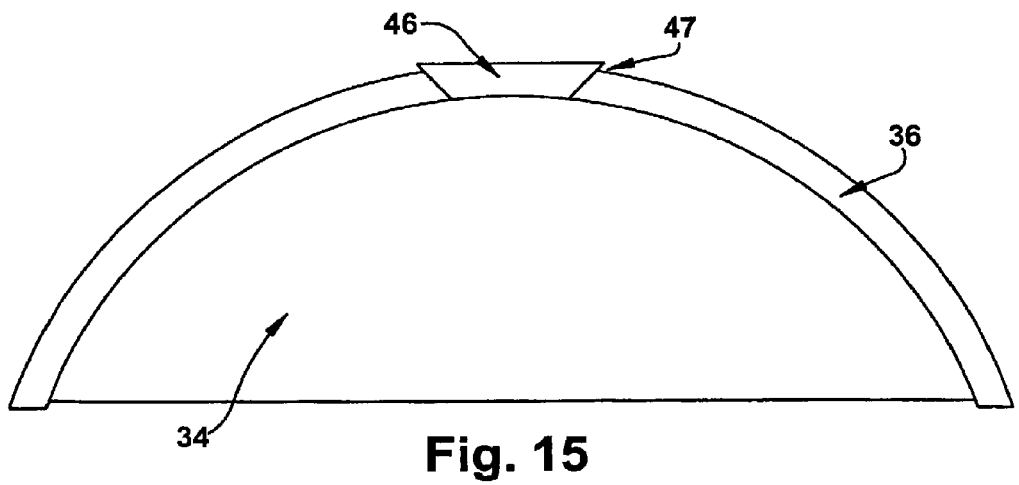
FIG. 15 is a sectional view of the of the boat hull with the composite patch essentially repairing the damaged area with some excess patch material extending beyond the original hull.
Figure 16:
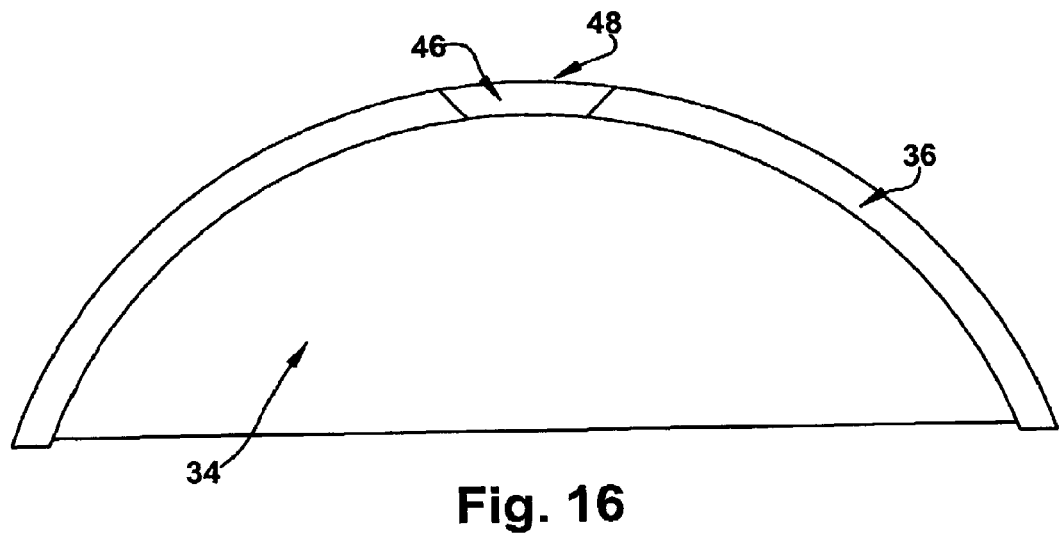
FIG. 16 is a sectional view of the machined and sanded patch so that the patch and the original hull are flush.
Figure 17:
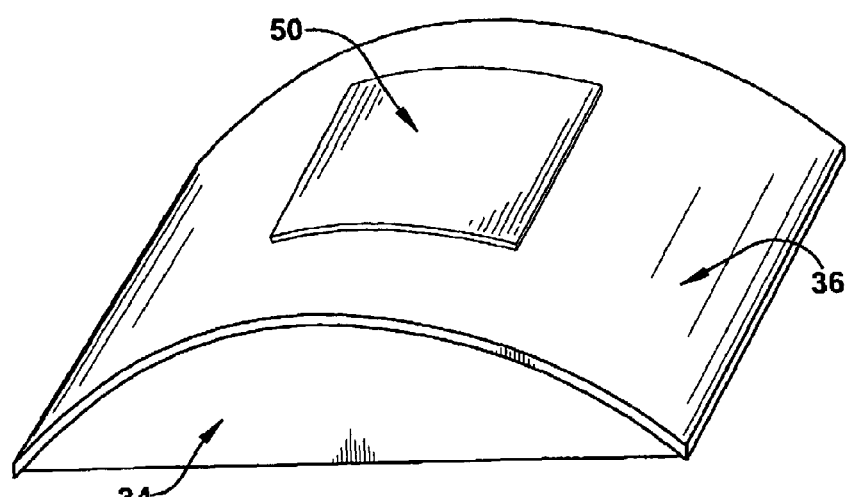
FIG. 17 is a perspective view of the hull fully repaired by the shape memory polymer composite patch.

Once the surface has been prepared for repair using normal methods, the shape memory polymer composite patch, 40, is activated by raising its temperature above its $T_g$. As shown in FIG. 14 the composite patch is then initially deformed, 44, into a shape that will make it easier to mold into the damaged area, 42, and the transition area, 43. While the temperature of the composite patch is above its $T_g$, the composite patch is formed and molded into the damaged area, 42, and surrounded by the transition area, 43, so that the entire damaged area and transition area are essentially covered by the patch. As shown in FIG. 15 the now molded composite patch, 46, has been placed so as to essentially cover the entire damaged area. Additionally, the molded patch, because of its soft and pliable state while heated, is able to fill in most gaps and crevices and completely replicate the entire damaged area and machined transition area. As previously noted, this process requires no cure time as the composite patch is already in an essentially cured state. Once the patch has been molded to the desired area, simply allow the patch to cool below its $T_g$ to return the patch to a hard, rigid state. This process should only take a few minutes. Alternatively the patch can be bonded to the damaged area The composite patch can be bonded to the original part with a variety of systems discussed below. Once cooled and bonded to the original part it is possible that there will be some excess material that will rise above and/or not be flush with the original, undamaged surface, as shown at 47 in FIG. 15. This excess material can be removed through sanding or other machine processes as shown in FIG. 16 where the final surface, 48, of the composite patch, 46, is now flush with the original part. FIG. 17 shows a final view of the patch, 50, used to fully repair the damaged area, 38, in FIG. 10. The composite patch is now flush with the surface and may be coated or painted as desired. It is to be appreciated that these repairs can be conducted not only by composite material but also by pure shape memory polymer resins which undergo the same activation, deformation, and bonding as seen in the above descriptions. It is also to be appreciated that this method of permanent repair can also be used for airplane parts, car parts, and any other manufactured part that can be repaired using composite material.

In order to bond the composite patch to a variety of systems, the adhesive must be chosen very carefully. There are a variety of commercially-available adhesive systems for use in bonding shape memory polymer composite patches to different substrates. The wide range of adhesives will aid in developing different patch systems for different applications. Some adhesives are aerospace compatible, while others can only be used for ground applications or mass produced items. Cryogenic compatible adhesives are also available for use in repairing cryogenic pipes and tanks. These adhesives can be divided into two categories: thermally cured adhesives and pressure sensitive adhesives. The thermally cured adhesives chosen can be cured at or above the transition temperature of the shape memory polymer composite as pressure and heat are applied to cure the adhesive, and the patch is soft and easily formed around the area to be patched. The pressure sensitive adhesives are effective for quick repairs in sealing spaces that contain different environments such as the inside of pressure vessels and gas or liquid conduits. These adhesives allow for a quick "bandage-type" approach until a more permanent solution could be achieved. The following adhesives could be used for various applications, but is not intended to limit adhesives within the scope of the present invention to only those listed below:

Thermally Cured Adhesives
    LORD Corporation Products
    310 NB Epoxy Adhesive
    7542 NE Urethane Adhesive
    3M Products
    Scotch-Weld AF 563K Film Adhesive
    Scotch-Weld AF 163-2 Film Adhesive
    Scotch-Weld EC 3333 B/A 2-Part Paste Adhesive
    Scotch-Weld EC 3448 Paste Adhesive (1-Part)
    Loctite Products
    Hysol® EA 9309.3 NA Epoxy Paste Adhesive
    Hysol® 615
    Hysol® U-05FL
    Hysol® EA 9361 Epoxy Paste Adhesive
    Hysol® EA 9628 Epoxy Film Adhesive
    Hysol® EA 9695 Epoxy Film Adhesive Hysol® EA 9696 Epoxy Film Adhesive Pressure Sensitive
    3M Products
    9244 Structural Bonding Tape
    468 MPR Structural Bonding Tape
    9485 PC High-Performance Adhesive Transfer Tape
    Budnick Converting, Inc. Products
    P02—Multi-purpose Double-Coated Splicing & Mounting
    1198—UHA Adhesive Transfer
    P50—Multi-purpose Double-Coated Cloth Tape The thermally cured adhesives can be applied by: 1) forming the shape memory polymer composite patch around the area to be bonded (without adhesive); 2) applying adhesive to the patch; and then 3) bonding the preformed patch to the damaged area through thermal cure. This approach is the easiest and cleanest method for using paste-type adhesives. This method may be enhanced by using vacuum pressure during thermal cure and choosing an adhesive that has a cure temperature above the transition temperature of the shape memory polymer composite used for the patch. This would allow for a more intimate interface between the patch and the substrate during cure. This helps promote distributed load transfer through the adhesive.

Pressure adhesives are applied to the shape memory polymer composite patch manually with the backing paper left intact. When repair is desired, 1) the patch/adhesive combination is heated above the transition temperature of the composite patch, 2) the backing paper is removed and 3) the patch is formed manually or with assistance and adhered simultaneously to the substrate. This method of adhesive application prior to use enables very fast repair scenarios. Additionally for light or electromagnetic radiation activated shape memory polymer composites, the patch adhesive combination is activated by application of said electromagnetic radiation, the patch is formed manually or with other mechanical assistance to the substrate and deactivated with electromagnetic radiation.

The following are examples of the process of bonding shape memory polymer composites to substrates according to all aspects of the invention:

Example 3

In order to bond a shape memory polymer composite patch to fiberglass, the area around the damaged portion of a part or the area near the portion of the part to be joined to another, the applicable area is scuff sanded and solvent wiped to ensure a clean, smooth bonding surface. Additionally, scuff sand and solvent wipe the side of the patch to be bonded to the substrate. Using 3M's 9485 PC High-Performance Adhesive Transfer Tape, apply the tape to the patch manually leaving the backing on the adhesive. Using the patch from Example 1 heat the patch above its transition temperature in an oven which is at or near 90° C. Remove the patch/adhesive from the oven, peel away the adhesive backing and form patch to fiberglass surface manually or with assistance of a vacuum pad or bagging.

Example 4

In order to bond a shape memory polymer composite patch to stainless steel the area around the damaged portion of a part or the area near the portion of the part to be joined to another is scuff sanded and solvent wiped to ensure a clean, smooth bonding surface. Additionally scuff sand and solvent wipe the side of the patch to be bonded to the substrate to ensure a smooth bonding surface. Apply a thin, even layer of Loctite HYSOL U05-FL paste adhesive to repair area on stainless steel. Using the patch from Example 1 heat the patch above its transition temperature. Form patch to repair surface manually or with a heating blanket using vacuum pressure. Cure adhesive according to manufacturers recommendations using temperature controller connected to the heating blanket or other method. Remove vacuum blanket after cure.

The bonding of the shape memory polymer composite patch can be done to various other substrates, metal cans, car fenders, other composite parts, using the method of Example 3 above. The methods described above are useful and one method should be chosen over the other method depending on the application. Thermally cured adhesives should generally be used for higher strength applications where time-to-repair is less critical such as airplane parts, load-bearing structural parts, and other parts with high strength or other mechanical properties as described in Example 4 above. Pressure sensitive adhesives should generally be used for lower strength applications where time-to-repair is more critical or the cost or strength is not as important such as leaking pipes or simple cosmetic repairs. After bonding with the correct adhesive and composite patch, the repaired part may be used normally. This includes flowing liquids or gasses through pipes at normal operating temperatures and pressures.

Because of the properties inherent in shape memory polymers, composites utilizing shape memory polymer as the resin matrix can be temporarily softened, reshaped, and rapidly hardened in real-time to function in a variety of structural configurations. They can be fabricated with nearly any type of fabric, and creative reinforcements can result in dramatic shape changes in functional structures and they are machinable.

Therefore, it can readily be seen that the present invention provides a quick and easy way to utilize composite and shape memory polymer technology to create a patch that has the flexibility of duct tape with the performance of composites and similar metal substances.

It is therefore apparent that one exemplary embodiment of the invention provides a method for repairing manufactured parts of the type having a damaged area thereof. A repair material is preformed into a desired shape. The repair material may comprise, for example, a shape memory polymer. The shape memory polymer is activated so that the preformed repair material becomes soft, and it is then deformed into a shape adapted for the repair function. The shape memory polymer is then deactivated while maintaining the polymer in its deformed state. Thereafter, the deformed shape memory polymer is bonded to the damaged area of the manufactured part.

The repair material may comprise a composite material formed from at least one layer of fibrous material in combination with a shape memory polymer. In one form, the fibrous material may be embedded within the shape memory polymer or, the fibrous material can be impregnated with the shape memory polymer.

The fibrous material may be chosen from carbon nanofibers, carbon fiber, spandex, chopped fiber, random fiber mat, fabric of any material, continuous fiber, fiberglass, or other types of textile fibers, yarns, and fabrics. For example, the fibrous material may be present in the form of a flat woven article, a two-dimensional weave, or a three-dimensional weave.

The shape memory polymer may be selected from a host of polymer types including styrene, cyanate esters, maleamide polymers, epoxy polymers, or vinyl ester polymers. In some cases, the shape memory polymer will be a thermoset resin.

The repair material may include a thermal energy generation means embedded therein. Such thermal energy generation means may comprise, for example, thermally conductive fibers or electrical conductors.

In another exemplary embodiment of the invention, activation of the shape memory polymer is achieved by heating the polymer above its transition temperature. The heating may, for example, be effected by inductive heating, hot air, or by heat lamps. Additionally, when the repair material comprises a thermal energy generation means embedded therein, it may be activated by applying electrical current to the thermal energy generation means.

In yet another exemplary embodiment of the invention, activation of the shape memory polymer may be achieved by application of electromagnetic radiation such as in the form of visible light or ultraviolet light.

The deformation step may be achieved via mechanical means such as by pressing in a press mold or by extruding the material through a rolling die mold.

In one exemplary embodiment of the invention, the shape memory polymer is deactivated by reducing the temperature thereof to below its activation temperature. This can be accomplished while the polymer is being press molded so that during the press molding, the polymer is maintained at a temperature below its activation temperature. Further, the deactivation of the shape memory polymer may be achieved by application of electromagnetic radiation such as visible light or ultraviolet light thereto.

The manufactured part may be composed of any material, such as metal, wood, plastic, glass, or in itself may be a composite part or similar material. The bonding step in accordance with the invention may be achieved via a host of conventional means such as via thermally cured adhesives or pressure sensitive adhesives.

In addition to shape memory polymers, other shape memory materials such as shape memory alloys may be mentioned as being effective.

Another aspect of the invention comprises joining a plurality of parts together via use of the shape memory materials. Here, the parts are juxtaposed so that at least one joint or joinder area is formed. A preformed shape memory material such as a shape memory polymer is provided and activated. The shape memory material is then applied to the joint or joinder area and deformed into a desired shape. The shape memory material is deactivated while maintaining it in its deformed shape. The deformed shape is then bonded to the joint area to effect joinder of the parts together.

Although this invention has been described with respect to certain preferred embodiments, it will be appreciated that a wide variety of equivalents may be substituted for those specific elements shown and described herein, all without departing from the spirit and scope of the invention as defined in the appended claims.

What is claimed is:

1. A method for repairing manufactured parts having a damaged area comprising:
   a. preforming a repair material into a desired shape, said repair material comprising a shape memory polymer;
   b. activating said shape memory polymer such that said preformed repair material becomes soft;
   c. deforming said preformed repair material into a shape that is molded to the damaged area, wherein said deforming is achieved by mechanical means;
   d. deactivating said shape memory polymer while maintaining said repair material in its deformed state; and
   e. bonding said deformed repair material to said damaged area of said manufactured part prior to or after deactivation, wherein one or more of steps b, c, d, and e can be iteratively repeated in any order to ensure that the repair material is molded to the damaged area.

2. The method of claim 1 wherein said repair material comprises a composite material formed from at least one layer of fibrous material in combination with said shape memory polymer.

3. The method of claim 2 wherein said fibrous material is embedded in said shape memory polymer.

4. The method of claim 2 wherein said fibrous material is carbon nano-fibers, carbon fiber, spandex, chopped fiber, random fiber mat, fabric of any material, continuous fiber, fiberglass, or other type of textile fabric.

5. The method of claim 2 wherein said fibrous material is in the form of a flat weave, two dimensional weave, or three dimensional weave pattern.

6. The method of claim 1 wherein said shape memory polymer is selected from the group consisting of a styrene shape memory polymer, cyanate ester shape memory polymer, maleamide shape memory polymer, epoxy shape memory polymer, or vinyl ester shape memory polymer.

7. The method of claim 1 wherein said shape memory polymer resin is a thermoset resin.

8. The method of claim 1 wherein said repair material comprises an embedded thermal energy generation means.

9. The method of claim 8 wherein said embedded thermal energy generation means comprises thermally conductive fibers.

10. The method of claim 8 wherein said embedded thermal energy generation means comprises an electrical conductor.

11. The method of claim 1 wherein said activation of said shape memory polymer is achieved by application of electromagnetic radiation.

12. The method of claim 11 where said electromagnetic radiation is visible light or ultraviolet light.

13. The method of claim 1 wherein deforming by mechanical means is accomplished in a press mold.

14. The method of claim 1 wherein deforming is accomplished by drawing material through a rolling die mold.

15. The method of claim 1 wherein said deactivation of said shape memory polymer is achieved by reducing the temperature of said shape memory polymer below its activation temperature.

16. The method of claim 1 wherein said deactivation of said shape memory polymer is accomplished by press molding said preform material and maintaining its temperature below said activation temperature.

17. The method of claim 1 wherein said deactivation of said shape memory polymer is achieved by application of electromagnetic radiation.

18. The method of claim 17 wherein said electromagnetic radiation is visible light or ultraviolet light.

19. The method of claim 1 wherein said bonding is achieved by a thermally cured adhesive or a pressure sensitive adhesive.

* * * * *